(12) United States Patent
Haraguchi et al.

(10) Patent No.: US 7,092,226 B2
(45) Date of Patent: Aug. 15, 2006

(54) CONSTANT-VOLTAGE POWER SUPPLY CIRCUIT

(75) Inventors: Akira Haraguchi, Kasugai (JP); Takashi Matsumoto, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/076,940

(22) Filed: Mar. 11, 2005

(65) Prior Publication Data

US 2005/0151522 A1    Jul. 14, 2005

Related U.S. Application Data

(63) Continuation of application No. PCT/JP03/04968, filed on Apr. 18, 2003.

(51) Int. Cl.
  *H02H 7/00* (2006.01)
(52) U.S. Cl. ........................................ 361/18
(58) Field of Classification Search .................. 361/18
  See application file for complete search history.

(56) References Cited

U.S. PATENT DOCUMENTS 4,218,647 A * 8/1980 Haas ........................... 323/268

FOREIGN PATENT DOCUMENTS

| JP | 5-92819 | 12/1993 |
|---|---|---|
| JP | 06-022447 | 1/1994 |
| JP | 06-105450 | 4/1994 |
| JP | 2001-025149 | 1/2001 |
| JP | 2001-265454 | 9/2001 |
| JP | 2001-333528 | 11/2001 |
| JP | 2003-33010 | 1/2003 |

* cited by examiner

*Primary Examiner*—Stephen W. Jackson
(74) *Attorney, Agent, or Firm*—Arent Fox PLLC

(57) ABSTRACT

A constant-voltage power supply circuit includes a constant-voltage output unit and an output current restriction unit. The constant-voltage output unit includes an output transistor and controls the transistor based on output voltage from the output transistor to maintain the output voltage constant. The output current restriction unit restricts output current of the constant-voltage output unit. When the overcurrent detection unit detects that current flowing through the output transistor that is an overcurrent flowing continuously for a predetermined time, the output current restriction unit executes an output current restriction operation. This configuration prevents the output voltage from decreasing after an overcurrent control operation.

16 Claims, 8 Drawing Sheets

CONSTANT-VOLTAGE POWER SUPPLY CIRCUIT

CROSS-REFERENCE TO RELATED APPLICATIONS

This nonprovisional application is a continuation application of and claims the benefit of International Application No. PCT/JP2003/004968, filed Apr. 18, 2003. The disclosure of the prior application is hereby incorporated herein in its entirety by reference.

BACKGROUND OF THE INVENTION

The present invention relates to a constant-voltage power supply circuit, and more particularly, to a constant-voltage power supply circuit provided with an overcurrent protection function.

A power supply circuit for supplying a constant-voltage power supply to devices such as a microprocessor unit (MPU) includes an overcurrent protection circuit. The overcurrent protection circuit prevents output of an overcurrent, which is generated when an electrical or mechanical failure occurs in a load. Such a constant-voltage power supply circuit is required to supply stable constant-voltage power while preventing generation of an overcurrent.

FIG. 7 is a schematic circuit diagram of a conventional constant-voltage power supply circuit 100. When an external power supply V1 goes on, a differential amplifier 1 is activated, and an output voltage of the differential amplifier 1 is applied to the gate of an output transistor T1, which is configured by a P-channel MOS (metal oxide semiconductor) transistor.

When the output transistor T1 goes on and an output voltage Vout is output, the output voltage Vout is divided by feedback resistors R1 and R2 to generate divided voltage at node N1. The divided voltage is applied to a non-inversion input terminal of the differential amplifier 1. A reference voltage V2 is applied to an inversion input terminal of the differential amplifier 1.

When the output voltage Vout increases, the potential at the node N1 also increases. This increases the output voltage of the differential amplifier 1. As a result, the drain current of the output transistor T1 decreases and the output voltage Vout decreases. When the output voltage Vout decreases, the potential at the node N1 also decreases. This decreases the output voltage of the differential amplifier 1. As a result, the drain current of the output transistor T1 increases and the output voltage Vout increases. Through such operations, the output voltage Vout converges on a constant voltage that is set based on the reference voltage V2.

Some of the drain current of the output transistor T1 is supplied to the collector of an NPN transistor T2 and the bases of transistors T2 and T3 via a resistor R3. The transistors T2 and T3 execute a current mirror operation.

A P-channel MOS transistor T4, which is operated based on the output voltage of the differential amplifier 1, executes a current mirror operation with the output transistor T1. The size of the transistor T4 is smaller than the size of the output transistor T1.

The drain current of the transistor T4 is supplied to the collectors of the transistor T3 and an NPN transistor T5 and to the bases of the NPN transistor T5 and an NPN transistor T6. The transistors T5 and T6 execute a current mirror operation. The collector of the transistor T6 is connected to a resistor R4 and to the gate of a transistor T7.

When the transistor T6 is turned on and a collector current flows through the transistor T6, the gate voltage of the P-channel MOS transistor T7 is lowered by the resistor R4. As a result, drain current flows through the transistor T7. This increases the gate voltage of the output transistor T1. As a result, the drain current of the output transistor T1 decreases.

In the constant-voltage power supply circuit 100 during normal operation, the operation of the feedback resistors R1 and R2 and the differential amplifier 1 keeps the output voltage Vout constant while changing the output current Iout of the output transistor T1. In this state, the drain current of the transistor T4 is entirely absorbed as the collector current of the transistor T3. This keeps the transistors T5, T6, and T7 off.

When the output current Iout increases and reaches a predetermined overcurrent detection value I1, the drain current of the transistor T4 cannot be further absorbed by the transistor T3. Thus, the transistors T5 and T6 are turned on. This turns on the transistor T7 and increases the gate voltage of the output transistor T1, decrease the output current Iout, and decreases the output voltage Vout. When the output current Vout decreases, the transistors T2 and T3 are turned off. Thus, the drain current of the transistor T4 keeps the transistors T5, T6, and T7 on, and the gate voltage of the output transistor T1 further increases.

As shown in FIG. 8, the output current Iout gradually decreases after the output current Iout reaches the overcurrent detection value I1. This gradually decreases the output voltage Vout. A predetermined restriction current I2 is continuously output even after the output voltage Vout reaches 0 V. In this way, the output current Iout decreases after reaching the overcurrent detection value I1. This control prevents the load from being damaged by an overcurrent.

In the constant-voltage power supply circuit 100, the restriction current I2 is continuously output even after the output voltage Vout decreases to 0 V. In this state, when the load current decreases, the drain current of the transistor T1 decreases and the drain current of the transistor T4 decreases. This decreases the base currents of the transistors T5 and T6. As a result, the drain current of the transistor T7 decreases and the gate voltage of the output transistor T7 decreases and the output current Iout increases. This increases the output voltage Vout and increases the base currents of the transistors T2 and T3. Thus, the drain current of the transistor T4 is absorbed by the transistor T3. As a result, the transistors T5, T6, and T7 are turned off so that the constant-voltage power supply circuit 100 recovers to a state in which constant voltage Vout can be output.

SUMMARY OF THE INVENTION

However, in some recent devices, such as an MPU, there may be an instantaneous flow of excessive consumption current. In the constant-voltage power supply circuit 100, the output voltage Vout decreases immediately when the output current Iout reaches the overcurrent detection value I1. This may cause the load circuit, which uses the output voltage Vout as its power supply, to function erroneously or fail to exhibit a predetermined performance.

Accordingly, the overcurrent detection value I1 may be set at a larger value by enlarging the output transistor T1 to increase the output current Iout and reduce the number of times the output voltage Vout decreases. However, this would increase the amount of heat generation and measures for solving this problem would be required.

The present invention provides a constant-voltage power supply circuit that minimizes decrease in output voltage after an overcurrent control operation is performed.

One aspect of the present invention is a constant-voltage power supply circuit provided with a constant-voltage output unit, including an output transistor in which output from the output transistor is controlled based on output voltage from the output transistor to maintain the output voltage at a constant voltage. An output current restriction unit restricts output current of the constant-voltage output unit. The output current restriction unit executes an output current restriction operation when current flowing through the output transistor is an overcurrent flowing continuously for a predetermined time.

Another aspect of the present invention is a constant-voltage power supply circuit provided with a constant-voltage output unit, including an output transistor in which output from the output transistor is controlled based on output voltage from the output transistor to maintain the output voltage at a constant voltage. An overcurrent detection unit connected to the constant-voltage output unit detects overcurrent flowing through the output transistor and generates a detection signal. An output current restriction unit connected to the overcurrent detection unit restricts output current of the constant-voltage output unit based on the detection signal of the overcurrent detection unit and removes the current restriction on the constant-voltage output unit when generation of the detection signal is stopped. The overcurrent detection unit includes a first control unit for generating the detection signal when the overcurrent flows continuously for a predetermined time or longer.

A further aspect of the present invention is a constant-voltage power supply circuit including an output transistor. A constant-voltage control unit is connected to the output transistor in which output from the output transistor is controlled based on output voltage from the output transistor to maintain the output voltage at a constant voltage. A first transistor executes a current mirror operation with the output transistor. A first overcurrent detection unit connected to the first transistor generates an overcurrent detection signal when overcurrent continuously flows through the output transistor for a predetermined time or longer based on output current of the first transistor. A second transistor executes a current mirror operation with the output transistor. A gate potential control unit, which is connected to the output transistor, the second transistor, and the first overcurrent detection unit, controls gate potential of the output transistor in response to the overcurrent detection signal to restrict current flowing through the output transistor.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

Figure 1:
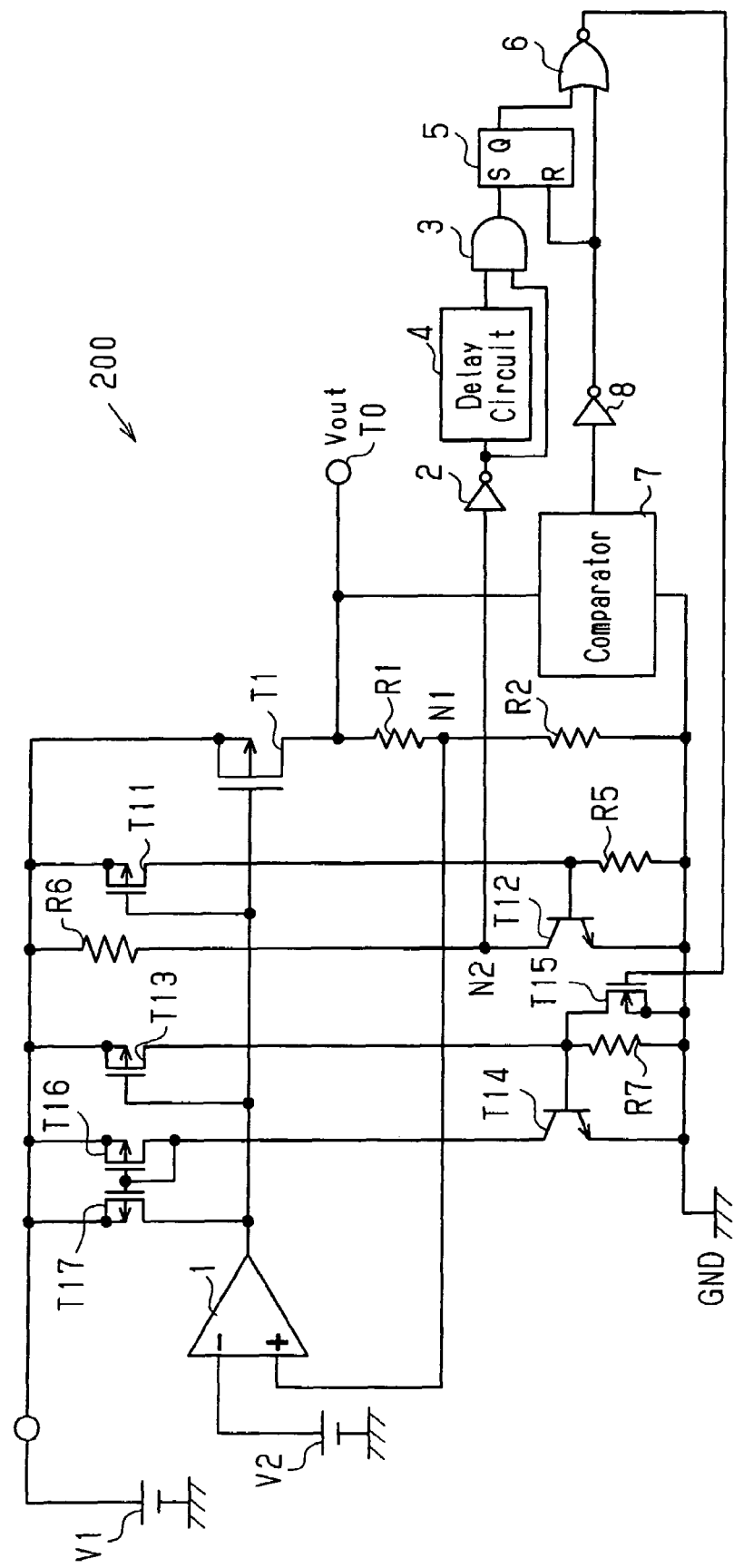
FIG. 1 is a schematic circuit diagram of a constant-voltage power supply circuit according to a first embodiment of the present invention.

FIG. 1 is a schematic circuit diagram of a constant-voltage power supply circuit 200 according to a first embodiment of the present invention. Like or same reference numerals are given to those components that are the same as the corresponding components of the prior art.

An output transistor T1, which has a source connected to an external power supply V1 and a drain connected to an output terminal To, is connected to the ground GND via feedback resistors R1 and R2.

A node N1 between the feedback resistor R1 and the feedback resistor R2 is connected to a non-inversion input terminal of a differential amplifier 1. A reference voltage V2 is supplied to an inversion input terminal of the differential amplifier 1. Output voltage of the differential amplifier 1 is supplied to the gate of the output transistor T1. The output transistor T1, the feedback resistors R1 and R2, and the differential amplifier 1 enable an output voltage Vout, which is set based on the reference voltage V2, to be output as a constant voltage from the output terminal To during normal operation.

A P-channel MOS transistor T11, which has a source connected to the external power supply V1 and a drain connected to the base of an NPN transistor T12, is connected to the ground GND via a resistor R5. The transistor T11 has a gate supplied with the output voltage of the differential amplifier 1. Thus, the transistor T11 executes a current mirror operation with the output transistor T1. The transistor T11 is smaller than the output transistor T1 in size.

The transistor T12 has a collector connected to the external power supply V1 via a resistor R6 and an emitter connected to the ground GND. Thus, when the drain current of the transistor T11 increases, the transistor T12 is turned on and the potential at the collector (node N2) of the transistor T12 decreases.

A P-channel MOS transistor T13, which has a source connected to the external power supply V1 and a drain connected to the base of an NPN transistor T14, is connected to the ground GND via a resistor R7. The base of the transistor T14 is connected to the ground GND via an N-channel MOS transistor T15.

The transistor T13 has a gate supplied with the output voltage of the differential amplifier 1. Thus, the transistor T13 executes a current mirror operation with the output transistor T1. The transistor T13 is smaller in size than the output transistor T1 and larger in size than the transistor T11. The resistors R5 and R7 have the same resistance. Thus, the transistor T13 operates at a higher speed than the transistor T11.

The transistor T14, which has an emitter connected to the ground GND and a collector connected to the drain of a P-channel MOS transistor T16 and to the gates of the P-channel MOS transistor T16 and a P-channel MOS transistor T17. The transistors T16 and T17 have sources connected to the external power supply voltage V1. The drain of the transistor T17 is connected to the gate of the output transistor T1. The transistors T16 and T17 execute a current mirror operation.

When the drain current of the transistor T13 increases when the transistor T15 is off, the transistor T14 is turned on. When the transistor T14 is turned on, the transistors T16 and T17 are turned on.

A node N2 is connected to an input terminal of an inverter circuit 2. An output signal of the inverter circuit 2 is provided to a first input terminal of an AND circuit 3, and is also provided to a second input terminal of the AND circuit 3 via a delay circuit 4.

An output signal of the AND circuit 3 is provided to a signal input terminal of a latch circuit 5 as an input signal S. An output signal Q output from an output terminal of the latch circuit 5 is provided to a first input terminal of a NOR circuit 6.

The output voltage Vout is supplied to a comparator 7. The comparator 7 compares the output voltage Vout with a predetermined threshold voltage. The comparator 7 outputs a high (H) level output signal to an inverter circuit 8 when the output voltage Vout is higher than the threshold value and provides a low (L) level output signal to the inverter circuit 8 when the output voltage Vout is lower than the threshold value.

Figure 2:
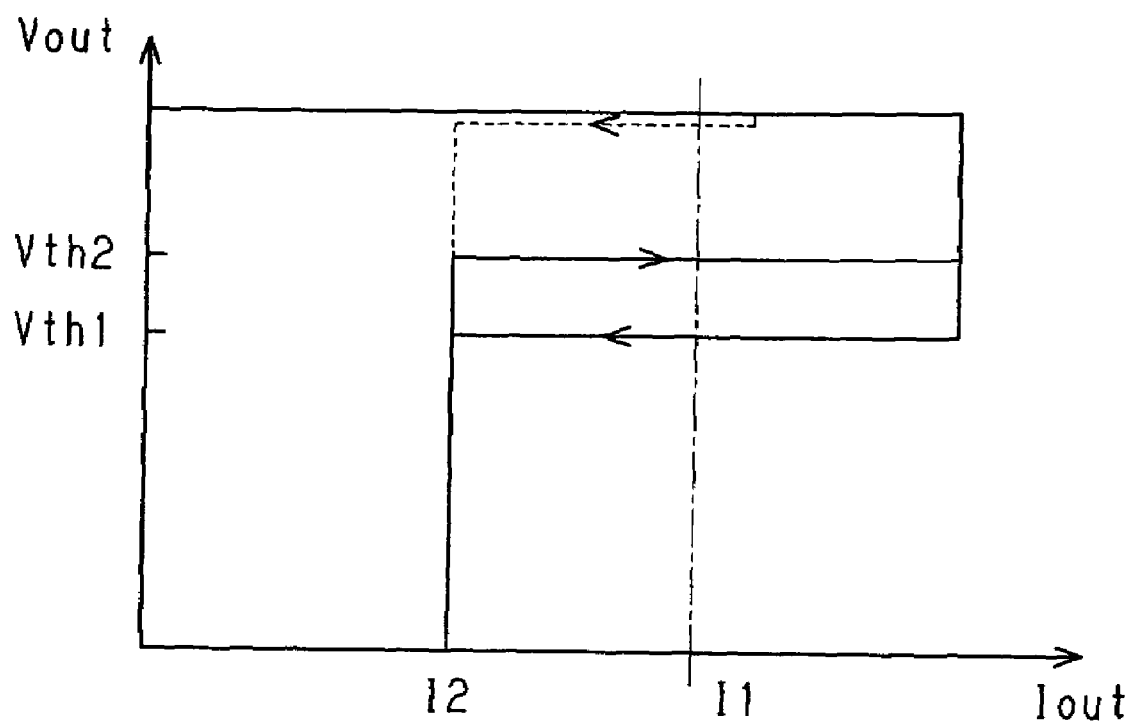
FIG. 2 is an output voltage-output current graph showing the operation of the constant-voltage power supply circuit of FIG. 1.

The threshold value used for the comparator 7 is set lower than a normal output voltage Vout and has hysteresis. More specifically, as shown in FIG. 2, a threshold value Vth1, which is used when the output voltage Vout decreases, and a threshold value Vth2, which is used when the output voltage Vout increases and which is larger than the threshold value Vth1, are set for the comparator 7.

An output signal of the inverter circuit 8 is provided to a reset terminal of the latch circuit 5, as a reset signal R, and to a second input terminal of the NOR circuit 6. The latch circuit 5 latches an H level input signal S and outputs the latched input signal S as the output signal Q. The latch circuit 5 resets the output signal Q to an L level when the reset signal R rises to an H level.

An output signal of the NOR circuit 6 is provided to the gate of the transistor T15. When the output signal of the NOR circuit 6 rises to an H level, the transistor T15 is turned on and the drain current of the transistor T13 is absorbed by the transistor T15. Thus, the transistors T14, T16, and T17 are turned off in this state. When the output signal of the NOR circuit 6 falls to an L level, the transistor T15 is turned off. In this state, when the drain current of the transistor T13 increases, the transistor T14 is turned on, and the transistors T16 and T17 are turned on.

The following describes the operation of the constant-voltage power supply circuit 200.

During normal operation, the differential amplifier 1, the output transistor T1, and the feedback resistors R1 and R2 generate the output voltage Vout, which is a constant voltage. Thus, the differential amplifier 1, the output transistor T1, and the feedback resistors R1 and R2 configure a constant-voltage output unit. The differential amplifier 1 and the feedback resistors R1 and R2 configure a constant-voltage control unit.

During generation of the constant voltage, the drain current of the transistor T11 is relatively small and the transistor T12 is off. Thus, the voltage at the node N2 is maintained at an H level, and an output signal having an L level is output from the inverter circuit 2. Accordingly, the output signal of the AND circuit 3 has an L level, and the output signal of the latch circuit 5 also has an L level. Further, the output voltage Vout is higher than the threshold value Vth1 of the comparator 7. Thus, the comparator 7 outputs an output signal having an H level, and the inverter circuit 8 outputs an output signal having an L level. In this state, the NOR circuit 6 is provided with input signals having an L level. Thus, the NOR circuit 6 outputs an output signal having an H level, and the transistor T15 is turned on. The transistors T14, T16, and T17 are maintained in an off state.

In this state, when a load circuit connected to the output terminal To short-circuits increases the output current Iout of the output transistor T1, the drain current of the transistor T11 also increases. Further, the base potential at the transistor T12 increases. Then, when the output current Iout exceeds the predetermined overcurrent detection value I1, the transistor T12 is turned on. This decreases the voltage at the node N2 to an L level and raises the output signal of the inverter circuit 2 to an H level.

When the output current Iout exceeds the overcurrent detection value I1 during a period exceeding a delay time, which is set by the delay circuit 4, the output signal of the AND circuit 3 rises to an H level and the output signal Q of the latch circuit 5 rises to an H level. Therefore, the output signal of the NOR circuit 6 falls to an L level, and the transistor T15 is turned off. When the transistor T15 is turned off, the drain current of the transistor T13 turns on the transistor T14. This turns on the transistors T16 and T17. As a result, the drain current of the transistor T17 increases the gate potential of the output transistor T1. As shown in FIG. 2, the output current Iout is instantaneously restricted at the restriction current value I2. The latch circuit 5 holds this restricted state (as indicated by the broken line).

The transistors T11 and T12 and the resistors R5 and R6 configure an overcurrent detection unit. The transistors T13, T14, T16, and T17, and the resistor R7 configure an output current restriction unit.

The delay time of the delay circuit 4 is set so that it is longer than the period during which a large consumption current flows through a device, which serves as the load, and so that the heat generation amount of the device does not become too large. This setting of the delay time of the delay circuit 4 prevents the device, which serves as the load, from functioning erroneously.

When the output current Iout is restricted at the restriction current value I2, the output voltage Vout decreases and becomes lower than the threshold value Vth1 of the comparator 7. Thus, the output signal of the comparator 7 falls to an L level, and the output signal of the inverter circuit 8 rises to an H level. As a result, the output signal Q of the latch circuit 5 is reset to an L level, and the output signal of the NOR circuit 6 is held at an L level.

Subsequently, when the short-circuited state of the load circuit is corrected and the output circuit Iout decreases, the output voltage Vout increases. When the output voltage Vout exceeds the threshold value Vth2 of the comparator 7, the output signal of the comparator 7 rises to an H level. Then, the output signal of the inverter circuit 8 falls to an L level, and the output signal of the NOR circuit 6 rises to an H level. Further, the transistor T15 is turned on, and the transistors T14, T16, and T17 are turned off. As a result, the constant-voltage output unit autonomously returns to normal operation and generates the output voltage Vout as a constant voltage.

When the output current Iout instantaneously increases during a period that does not exceed the delay time, which is set by the delay circuit 4, while a constant voltage is being output, the output current Iout, which corresponds to the value of the output voltage Vout (constant voltage value) and the driving capability (i.e., constant voltage) of the output transistor T1, may be supplied to the load until it reaches its maximum value. The value of the output voltage Vout is set by the external power supply V1 and the reference voltage V2. The driving capability of the output transistor T1 is determined by the size of the transistor T1.

When the constant voltage is being output, if the output current Iout instantaneously increases causing the output current Iout supplied the load to become greater than or equal to the driving capacity of the transistor T1 and causing the output voltage Vout to become lower than the threshold value Vth1 of the comparator 7, the output signal of the comparator 7 falls to an L level. Thus, the output signal of the NOR circuit 6 falls to an L level and the transistors T14, T16, and T17 are turned on. This restricts the output current Iout. This operation is executed even when the period during which the output current Iout is greater than or equal to the overcurrent detection value I1 does not exceed the delay time set by the delay circuit 4.

The following describes the operation of the constant-voltage power supply circuit 200 when the constant-voltage power supply circuit 200 is activated by the external power supply V1. When the activation of the external power supply V1 increases the power supply voltage, the reference voltage V2 is supplied to the differential amplifier 1 to operate the differential amplifier 1. In this state, the output voltage Vout is equal to the potential of the ground GND. Thus, the operation of the differential amplifier 1 turns on the output transistor T1 and increases the output voltage Vout.

In this state, the output voltage Vout is still at an L level. Thus, the comparator 7 outputs an output signal having an L level, the NOR circuit 6 outputs an output signal having an L level, and the transistor T15 is turned off. Further, the inverter circuit 8 outputs an output signal having an H level, and the output signal Q of the latch circuit 5 is reset to an L level. Thus, when the drain current of the output transistor T1 increases, the transistors T14, T16, and T17 are turned on. This restricts the output current Iout.

When the output voltage Vout exceeds the threshold value Vth2 of the comparator 7, the output signal of the comparator 7 rises to an H level, the input signals of the NOR circuit 6 both fall to an L level, and the output signal of the NOR circuit 6 rises to an H level. Then, the transistor T15 is turned on and the transistors T14, T16, and T17 are turned off. This stops the output current control operation. Then, the operation of the constant-voltage output unit outputs the output voltage Vout, which is a constant voltage.

The constant-voltage power supply circuit 200 has the advantages described below.

(1) The operation of the output current restriction unit keeps the output current Iout less than or equal to the overcurrent detection value I1 when the output current Iout exceeds the overcurrent detection value I1 during a period longer than or equal to the predetermined time, which is set by the delay circuit 4.

(2) When the period during which the output current Iout exceeds the overcurrent detection value I1 is shorter than the predetermined time set by the delay circuit 4, the output current Iout is not restricted. This prevents the output voltage Vout from decreasing. Accordingly, a decrease in the output voltage Vout, which would be caused by an instantaneous overcurrent, is prevented without enlarging the output transistor T1.

(3) When the output current restriction unit restricts the output current Iout and the output voltage Vout decreases, the cause of the overcurrent factor of the output current Iout is eliminated. Thus, when the output voltage Vout increases, the output current restriction unit automatically stops operating, and the output current restriction unit autonomously returns to execute a constant voltage output operation.

(4) When the output voltage Vout decreases and becomes less than or equal to the threshold value Vth1, which is set in the comparator 7, the output current restriction unit operates irrespective of the output current Iout. This prevents the output current Iout from being an overcurrent.

(5) The output current restriction unit operates when the circuit 200 is powered on. This prevents an overshoot of the output voltage Vout and the output current Iout.

(6) During normal constant voltage operation, the transistors T12, T14, and T16 are maintained in an off state. This reduces current consumption of the circuit 200.

Second Embodiment

Figure 3:
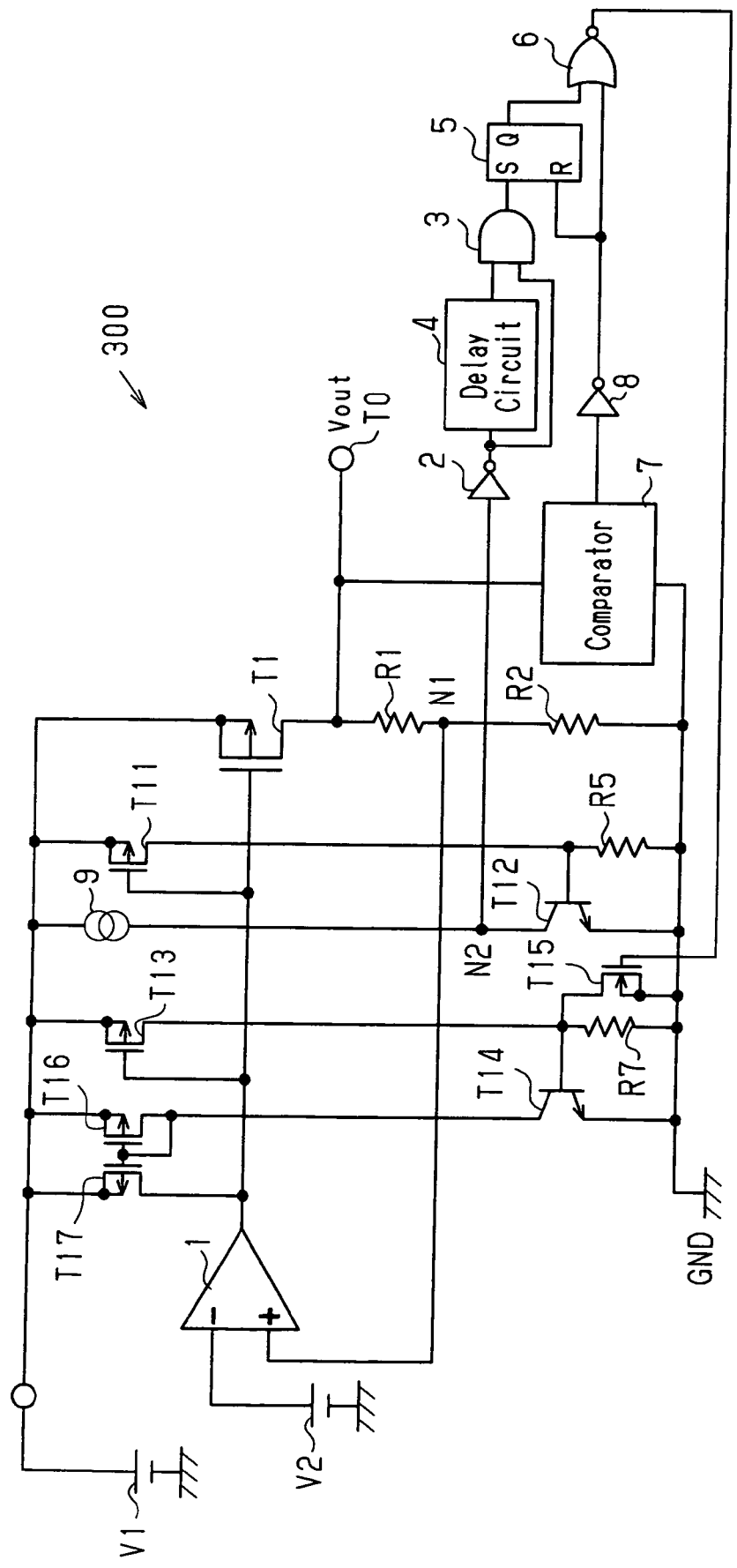
FIG. 3 is a schematic circuit diagram of a constant-voltage power supply circuit according to a second embodiment of the present invention.

FIG. 3 is a schematic circuit diagram of a constant-voltage power supply circuit 300 according to a second embodiment of the present invention. In the second embodiment, the resistor R6 in the first embodiment is replaced by a current source 9. The other parts are the same as in the first embodiment.

Due to this configuration, the constant-voltage power supply circuit 200 has the same advantages as the first embodiment.

Third Embodiment

Figure 4:
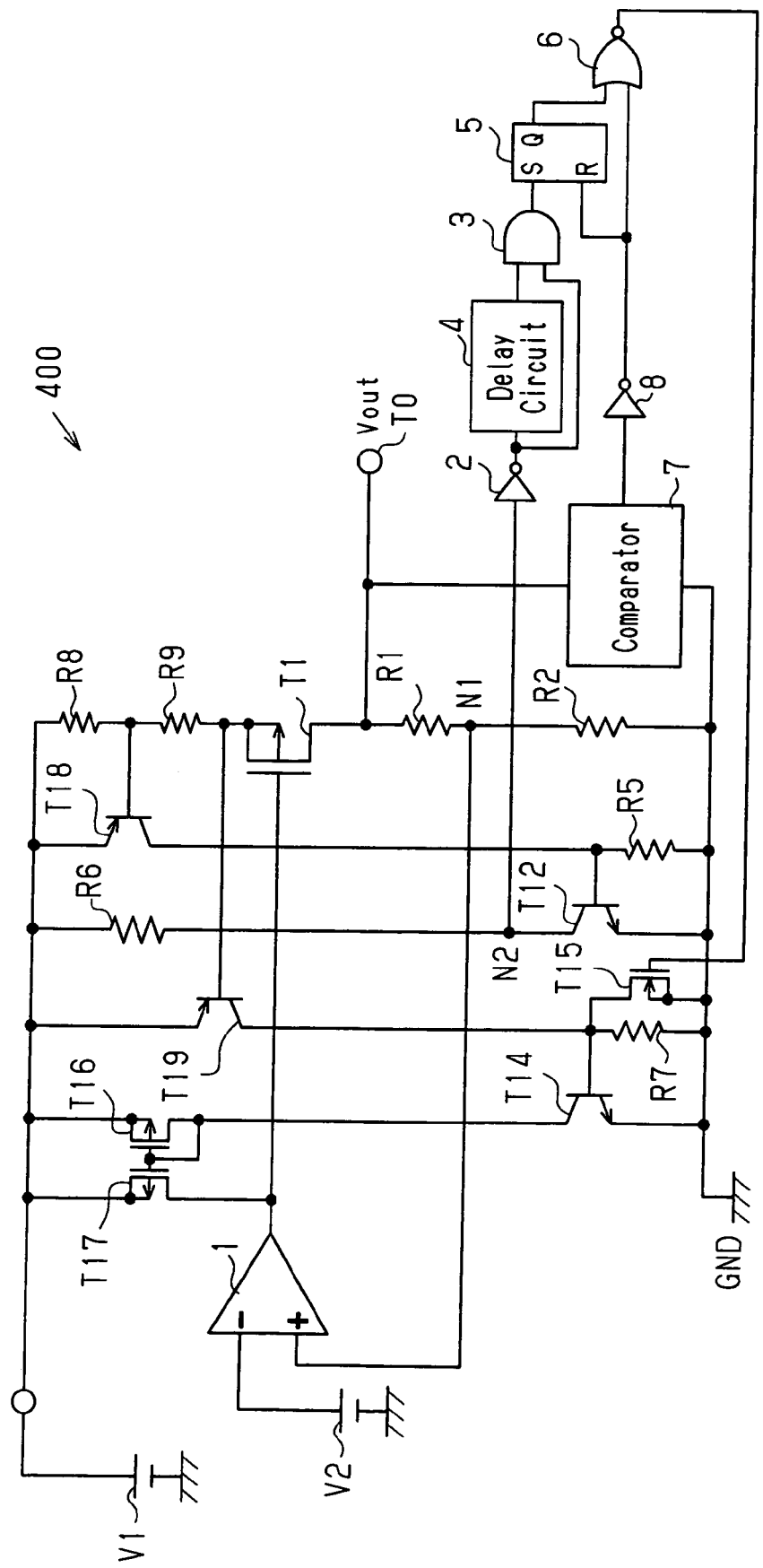
FIG. 4 is a schematic circuit diagram of a constant-voltage power supply circuit according to a third embodiment of the present invention.

FIG. 4 is a schematic circuit diagram of a constant-voltage power supply circuit 400 according to a third embodiment of the present invention. In the third embodiment, the transistor T11 in the first embodiment is replaced by a PNP transistor T18, and the transistor T13 in the first embodiment is replaced by a PNP transistor T19.

Resistors R8 and R9 are connected between the external power supply V1 and the source of the output transistor T1. Further, the base of the transistor T18 is connected to a node between the resistors R8 and R9. The base of the transistor T19 is connected to a node between the resistor R9 and the source of the output transistor T1.

In such a configuration, the collector currents of the transistors T18 and T19 increase when the output current Iout increases. Thus, the third embodiment has the same advantages as the first embodiment.

The transistors T18 and T19 have different base potentials. Thus, even if the transistors T18 and T19 are equal in size, the transistors T18 and T19 operate in the same manner as the transistors T11 and T13 in the first embodiment. More specifically, the base potentials of the transistors T18 and T19 are set so that the transistor T19 operates at a higher speed than the transistor T18. Further, the overcurrent detection value I1 is easily adjusted by adjusting the resistances of the resistors R8 and R9.

Fourth Embodiment

Figure 5:
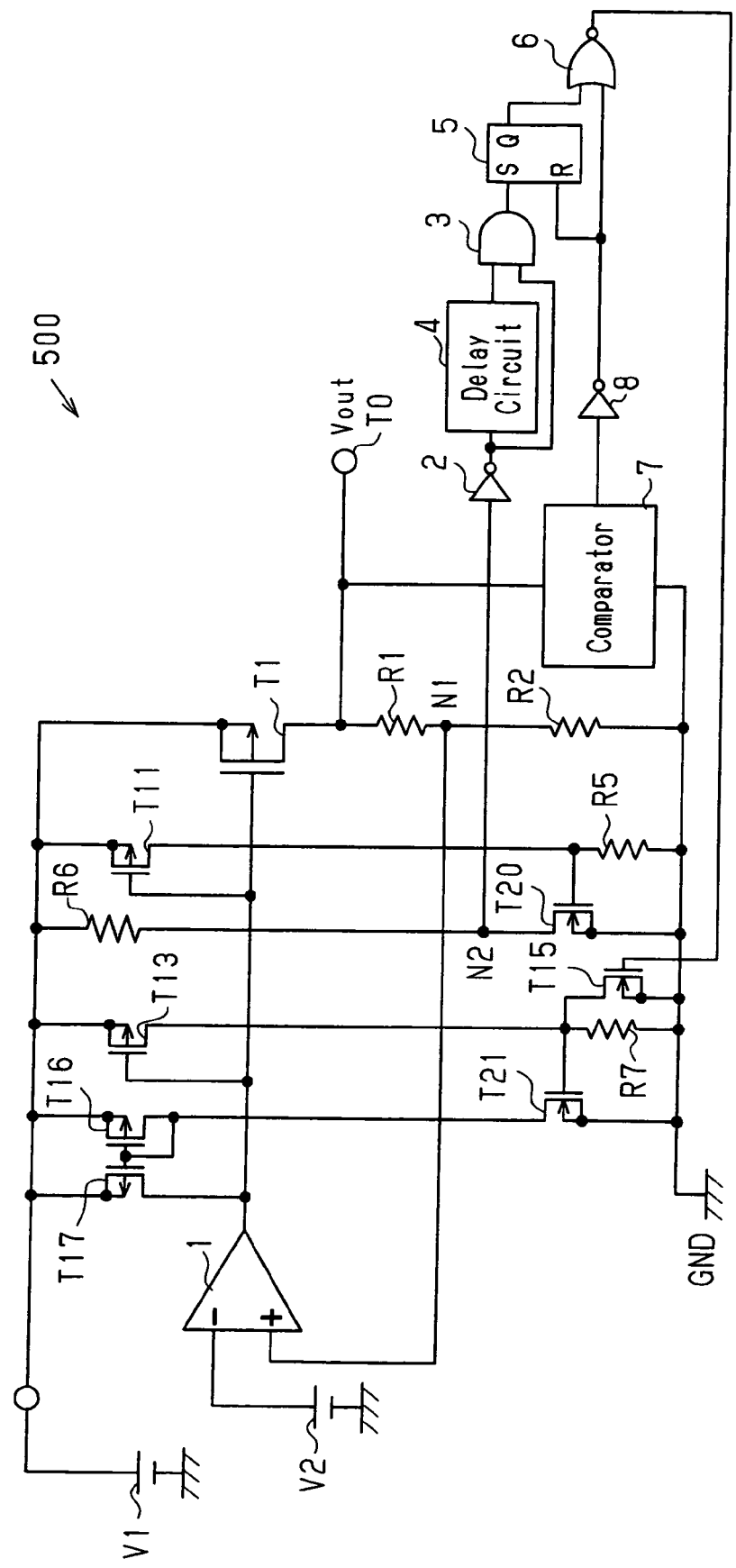
FIG. 5 is a schematic circuit diagram of a constant-voltage power supply circuit according to a fourth embodiment of the present invention.

FIG. 5 is a schematic circuit diagram of a constant-voltage power supply circuit 500 according to a fourth embodiment of the present invention. In the fourth embodiment, the transistors T12 and T14 in the first embodiment are replaced by N-channel MOS transistors T20 and T21.

In such a configuration, the constant-voltage power supply circuit 500 has the same advantages as the first embodiment.

Fifth Embodiment

Figure 6:
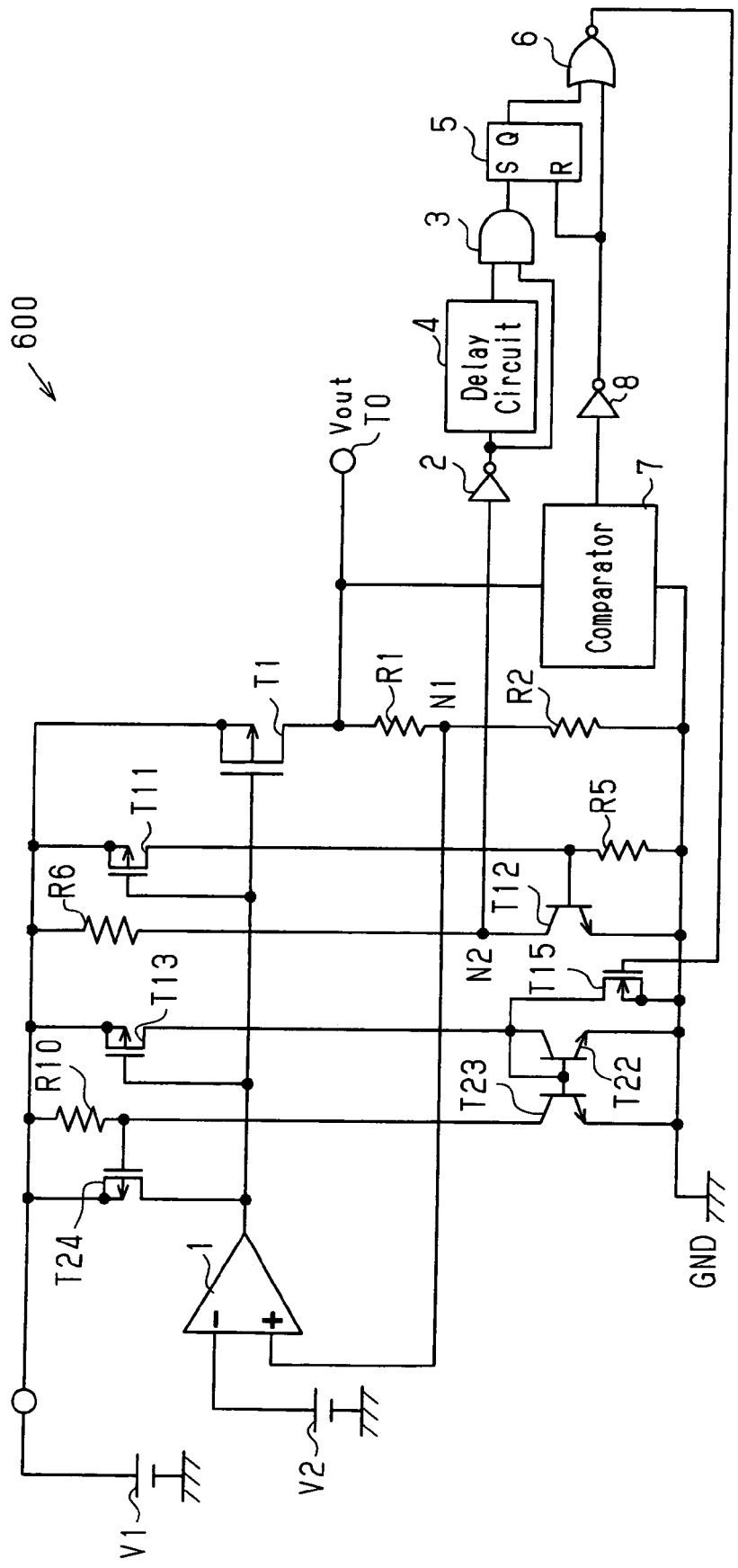
FIG. 6 is a schematic circuit diagram of a constant-voltage power supply circuit according to a fifth embodiment of the present invention.
Figure 7:
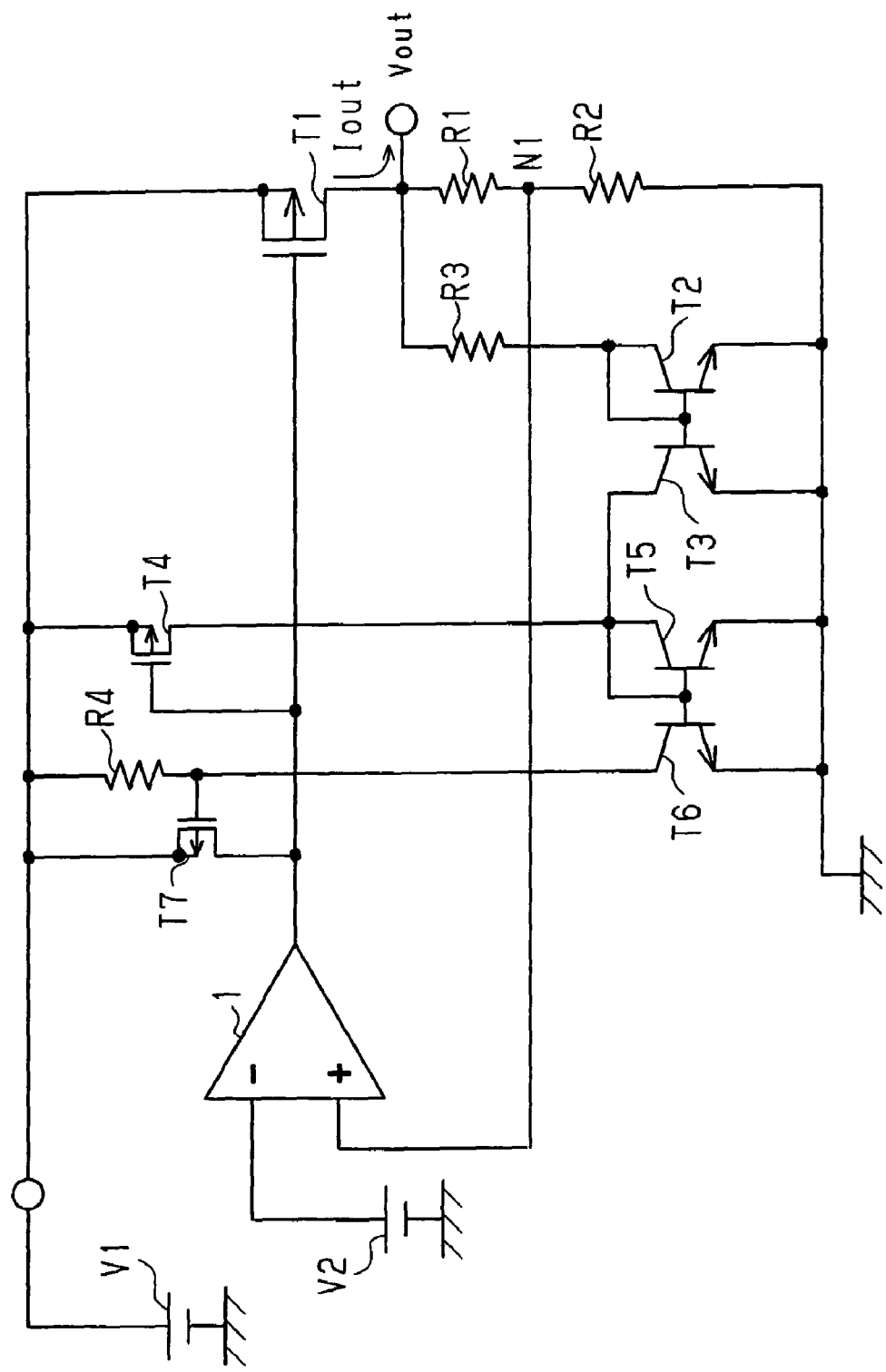
FIG. 7 is a schematic circuit diagram of a constant-voltage power supply circuit in the prior art.
Figure 8:
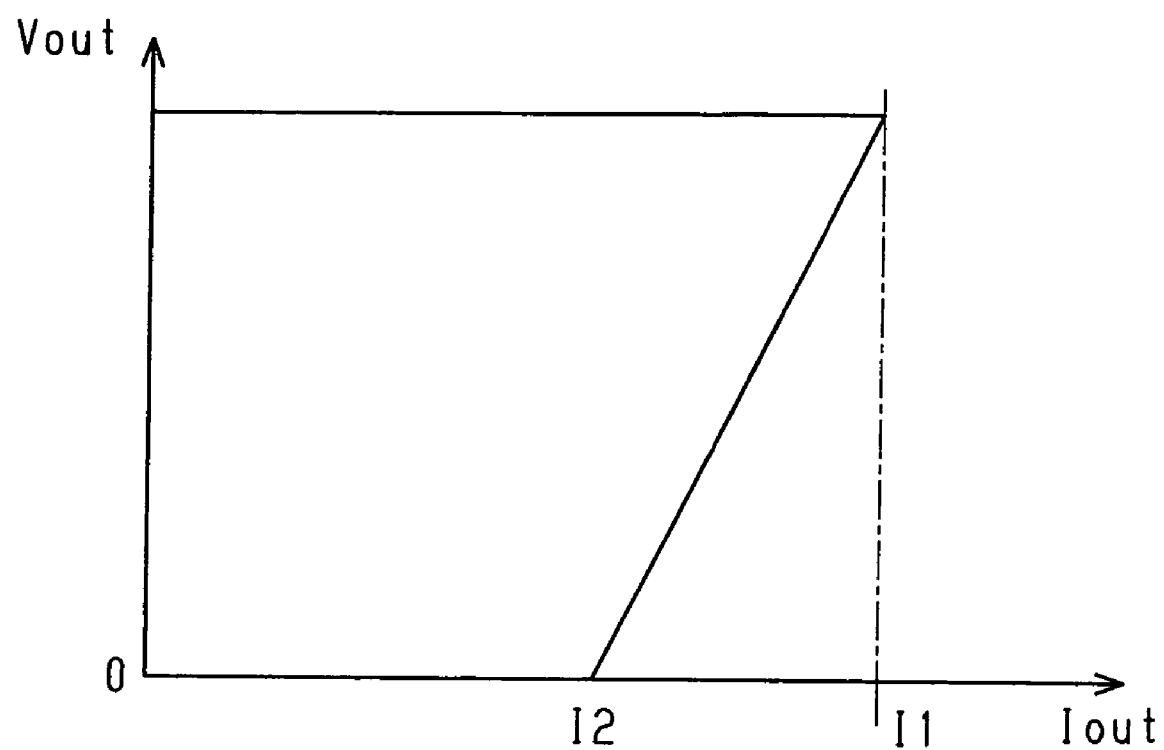
FIG. 8 is an output voltage-output current graph showing the operation of the constant-voltage power supply circuit of FIG. 7.

FIG. 6 is a schematic circuit diagram of a constant-voltage power supply circuit 600 according to a fifth embodiment of the present invention. In the fifth embodiment, the structure of the output current control unit in the first embodiment is changed.

Specifically, the drain of the transistor T13 is connected to the collector of the NPN transistor T22 and to the bases of the NPN transistors T22 and T23. The transistors T22 and T23 configure a current mirror circuit.

The collector of the transistor T23 is connected to the external power supply V1 via the resistor R10. The P-channel MOS transistor T24 has a source connected to the external power supply V1 and a drain connected to the gate of the output transistor T1. The gate of the transistor T24 is connected to the collector of the transistor T23.

In such a configuration, the transistors T22 and T23 execute a current mirror operation based on the drain current of the transistor T13 when the transistor T15 is off. When the drain current of the transistor T23 increases, the transistor T24 is turned on. This increases the gate potential at the output transistor T1.

The constant-voltage power supply circuit 600 has the same advantages as the first embodiment.

The present examples and embodiments are to be considered as illustrative and not restrictive, and the invention is not to be limited to the details given herein, but may be modified within the scope and equivalence of the appended claims.

What is claimed is:

1. A constant-voltage power supply circuit, comprising:
   a constant-voltage output unit, including an output transistor in which output from the output transistor is controlled based on output voltage from the output transistor to maintain the output voltage at a constant voltage; and
   an output current restriction unit for restricting output current of the constant-voltage output unit, the output current restriction unit executing an output current restriction operation when current flowing through the output transistor is an overcurrent flowing continuously for a predetermined time.

2. The constant-voltage power supply circuit according to claim 1, wherein the constant voltage is supplied to a load circuit having a consumption current and the predetermined time is set longer than a period during which the consumption current of the load circuit is an overcurrent.

3. A constant-voltage power supply circuit, comprising:
   a constant-voltage output unit, including an output transistor in which output from the output transistor is controlled based on output voltage from the output transistor to maintain the output voltage at a constant voltage;
   an overcurrent detection unit, connected to the constant-voltage output unit, for detecting overcurrent flowing through the output transistor and generating a detection signal; and
   an output current restriction unit, connected to the overcurrent detection unit, for restricting output current of the constant-voltage output unit based on the detection signal of the overcurrent detection unit and for removing the current restriction on the constant-voltage output unit when generation of the detection signal is stopped, wherein the overcurrent detection unit includes a first control unit for generating the detection signal when the overcurrent flows continuously for a predetermined time or longer.

4. The constant-voltage power supply circuit according to claim 3, further comprising:
   a second control unit, connected to the constant-voltage output unit, for generating the detection signal when the output voltage of the output transistor decreases by a predetermined voltage or more.

5. The constant-voltage power supply circuit according to claim 4, wherein the second control unit includes a comparator for comparing the output voltage of the output transistor with a predetermined threshold value.

6. The constant-voltage power supply circuit according to claim 3, wherein the overcurrent detection unit includes:
   a first transistor for executing a current mirror operation with the output transistor; and
   a conversion unit for converting output current of the first transistor into a logical signal; and
   the first control unit includes:
   a determination unit, connected to the conversion unit, for determining whether the logical signal is maintained at an overcurrent detection value for the predetermined time or longer and for generating a determination signal, and
   a latch unit, connected to the determination unit, for latching the determination signal of the determination unit and generating the detection signal.

7. The constant-voltage power supply circuit according to claim 6, wherein the output current restriction unit includes:
   a second transistor for executing a current mirror operation with the output transistor; and
   a gate potential control unit, connected to the second transistor, the constant-voltage output unit, and the overcurrent detection unit, for increasing gate potential of the output transistor in proportion to an output current of the second transistor and for stopping operation of the output transistor based on the detection signal.

8. The constant-voltage power supply circuit according to claim 7, wherein the output transistor, the first transistor, and the second transistor each include a P-channel MOS transistor, the first transistor and the second transistor are each smaller in size than the output transistor, the conversion unit includes a third transistor, connected to the first transistor, for executing a switching operation based on drain current of the first transistor, the gate potential control unit including a fourth transistor, connected to the second transistor, for executing a switching operation based on drain current of the second transistor, and the second transistor is larger in size that the first transistor so that the fourth transistor is turned on before the third transistor.

9. The constant-voltage power supply circuit according to claim 7, wherein the output transistor includes a P-channel MOS transistor, the first transistor and the second transistor each include a PNP transistor, the conversion unit includes a third transistor, connected to the first transistor, for executing a switching operation based on collector current of the first transistor, the gate potential control unit includes a fourth transistor, connected to the second transistor, for executing a switching operation based on collector current of the second transistor, the constant-voltage power supply circuit further comprising:

first and second resistors, connected to the output transistor, for respectively supplying a first voltage and a second voltage, which correspond to drain current of the output transistor, to bases of the first and second transistors, the first voltage and the second voltage being set so that the fourth transistor is turned on before the third transistor.

10. A constant-voltage power supply circuit, comprising:
an output transistor;
a constant-voltage control unit connected to the output transistor in which output from the output transistor is controlled based on output voltage from the output transistor to maintain the output voltage at a constant voltage;
a first transistor for executing a current mirror operation with the output transistor;
a first overcurrent detection unit, connected to the first transistor, for generating an overcurrent detection signal when overcurrent continuously flows through the output transistor for a predetermined time or longer based on output current of the first transistor;
a second transistor for executing a current mirror operation with the output transistor; and
a gate potential control unit, connected to the output transistor, the second transistor, and the first overcurrent detection unit, for controlling gate potential of the output transistor in response to the overcurrent detection signal to restrict current flowing through the output transistor.

11. The constant-voltage power supply circuit according to claim 10, wherein the first overcurrent detection unit includes:
a conversion unit, connected to the first transistor, for converting the output current of the first transistor into a logical signal;
a determination unit, connected to the conversion unit, for determining whether the logical signal is maintained at an overcurrent detection value for the predetermined time and for generating a determination signal; and
a latch unit, connected to the determination unit, for latching the determination signal of the determination unit and generating an overcurrent detection signal.

12. The constant-voltage power supply circuit according to claim 11, wherein the output transistor, the first transistor, and the second transistor each include a. P-channel MOS transistor, the first and second transistors each are smaller in size than the output transistor, the conversion unit includes a third transistor, connected to the first transistor, for executing a switching operation based on drain current of the first transistor, and the gate potential control unit includes a fourth transistor, connected to the second transistor, for executing a switching operation based on drain current of the second transistor.

13. The constant-voltage power supply circuit according to claim 11, wherein the output transistor includes a P-channel MOS transistor, the first transistor and the second transistor each include a PNP transistor, the conversion unit includes a third transistor, connected to the first transistor, for executing a switching operation based on collector current of the first transistor, the gate potential control unit includes a fourth transistor, connected to the second transistor, for executing a switching operation based on collector current of the second transistor, the constant-voltage power supply circuit further comprising:

first and second resistors, connected to the output transistor, for respectively supplying a first voltage and a second voltage, which correspond to drain current of the output transistor, to bases of the first and second transistors.

14. The constant-voltage power supply circuit according to claim 10, further comprising:
a second overcurrent detection unit, connected to the constant-voltage control unit, for generating the overcurrent detection signal when the output voltage of the output transistor decreases by a predetermined voltage or more.

15. The constant-voltage power supply circuit according to claim 14, wherein the second overcurrent detection unit includes a comparator for comparing the output voltage of the output transistor with a predetermined threshold value.

16. The constant-voltage power supply circuit according to claim 10, further comprising:
a transistor, connected to the first overcurrent detection unit and the gate potential control unit, for selectively activating the gate potential control unit in response to the overcurrent detection signal.

* * * * *